United States Patent [19]

Segars

[11] Patent Number: 6,021,476
[45] Date of Patent: Feb. 1, 2000

[54] DATA PROCESSING APPARATUS AND METHOD FOR CONTROLLING ACCESS TO A MEMORY HAVING A PLURALITY OF MEMORY LOCATIONS FOR STORING DATA VALUES

[75] Inventor: Simon Anthony Segars, Cherry Hinton, United Kingdom

[73] Assignee: Arm Limited, Cambridge, United Kingdom

[21] Appl. No.: 08/921,478

[22] Filed: Sep. 2, 1997

[30] Foreign Application Priority Data

Apr. 30, 1997 [GB] United Kingdom ............... 9708822.2

[51] Int. Cl.⁷ .................................................. G06F 12/00
[52] U.S. Cl. ........................... 711/163; 711/151; 711/152
[58] Field of Search ..................................... 711/151, 152, 711/158, 163, 170

[56] References Cited

U.S. PATENT DOCUMENTS

| | | | |
|---|---|---|---|
| 4,038,645 | 7/1977 | Birney et al. | 711/206 |
| 4,609,995 | 9/1986 | Hasebe | 710/244 |
| 5,465,343 | 11/1995 | Henson et al. | 711/112 |
| 5,742,826 | 4/1998 | Endicott et al. | 395/683 |

*Primary Examiner*—John W. Cabeca
*Assistant Examiner*—Mehdi Namazi
*Attorney, Agent, or Firm*—Nixon & Vanderhye P.C.

[57] ABSTRACT

A data processing apparatus and method for controlling access to a memory having a plurality of memory locations for storing data values, each memory location having a corresponding address. The apparatus includes address range storage for storing information identifying address ranges for a plurality of logical regions within said memory, and attribute storage for storing, for each logical region, attributes used to control access to memory locations within said logical region. In accordance with preferred embodiments, one or more of these logical regions may overlap with one another. Further, address comparator logic is provided for comparing an address issued by a processor corresponding to one of said memory locations with the address ranges for said plurality of logical regions, and, if one or more of the logical regions contains said address, for generating a signal indicating those logical regions containing said address. Attribute determination logic, responsive to the signal generated by the address comparator logic, is then used to apply predetermined priority criteria to determine which logical region containing said address has the highest priority, whereby the attributes in the attribute storage corresponding to that highest priority region are used for controlling access to the memory location specified by the address.

17 Claims, 4 Drawing Sheets

| SIZE [4:0] | REGION SIZE |
|---|---|
| 01011 | 4KB |
| 01100 | 8KB |
| 01101 | 16KB |
| 01110 | 32KB |
| ..... | .... |
| 11100 | 512MB |
| 11101 | 1 GB |
| 11110 | 2GB |
| 11111 | 4GB |

*FIG. 2*

DATA PROCESSING APPARATUS AND METHOD FOR CONTROLLING ACCESS TO A MEMORY HAVING A PLURALITY OF MEMORY LOCATIONS FOR STORING DATA VALUES

BACKGROUND OF THE INVENTION

1. Field of the Invention

The present invention relates to a data processing apparatus and method for accessing a memory having a plurality of memory locations for storing data values, and in particular to such a data processing apparatus and method that protects memory accesses. The term 'data value' is used herein to refer to both instructions and to items or blocks of data, such as data words.

2. Description of the Prior Art

It is known to segment memory into a number of separate logical regions, and to specify protection attributes for each of the regions, such as whether the regions are accessible in supervisor mode only, whether the regions are cacheable, bufferable in a cache based system, etc, to control access to those memory regions. Hence, if a processor issues a memory address which falls within a particular memory region, then the protection attributes for that region can be used to determine whether the processor, in its current mode of operation, is entitled to access that memory address, and to determine whether data values retrieved from that memory region are cacheable, whether data values to be written to that memory region are bufferable, etc. Often, but not exclusively, such protection mechanisms are used in virtual memory systems in association with virtual to physical address translation.

In most implementations, there is limited flexibility provided for defining the logical regions. The logical regions may typically be of a fixed size, such as 4 kb regions, although some techniques may improve flexibility somewhat by providing a few different sized regions, such as 1 kb, 2 kb and 4 kb regions. Typically, if different sized regions are provided, they will be constrained to vary by powers of two, since the hardware necessary to compare addresses to determine the logical regions containing those addresses can be less complex if the regions are constrained to sizes that vary by power of two.

Using the above approach, it is possible to specify user areas of memory, and supervisor areas of memory. For example, consider the case where fixed size logical regions of 4 kb are provided, and the system requires 4 kb of supervisor code and 12 kb of user code, both of which must be mapped into a 16 kb RAM. Four logical regions need to be defined to achieve this, ie. one 4 kb region for the supervisor code, and three 4 kb regions for the user code.

It would be desirable to provide the above functionality whilst defining less regions than are required in the above-described prior art techniques, thereby improving the flexibility of the system.

SUMMARY OF THE INVENTION

Viewed from a first aspect, the present invention provides a data processing apparatus for controlling access to a memory having a plurality of memory locations for storing data values, each memory location having a corresponding address, the apparatus comprising: address range storage for storing information identifying address ranges for a plurality of logical regions within said memory; attribute storage for storing, for each logical region, attributes used to control access to memory locations within said logical region; address comparator logic for comparing an address issued by a processor corresponding to one of said memory locations with the address ranges for said plurality of logical regions, and, if one or more of the logical regions contain said address, for generating a signal indicating those logical regions containing said address; and attribute determination logic, responsive to the signal generated by the address comparator logic, for applying predetermined priority criteria to determine which logical region containing said address has the highest priority, whereby the attributes in the attribute storage corresponding to that highest priority region are used for controlling access to the memory location specified by the address.

In accordance with the present invention, overlapping logical regions may be defined, and relative priorities assigned to each logical region. If the processor specifies an address which falls within two or more logical regions, then the priority criteria are used to determine which logical region has the highest priority. Each logical region will have a number of attributes specified for that region which are used to control the access to the memory locations within that logical region. Based on the determination of which region has the highest priority, the attributes for that highest priority region are then used to control the access to the specific memory location specified by the processor.

Hence, with reference to the example mentioned earlier, where it was desired to provide 4 kb of supervisor code and 12 kb of user code within a 16 kb RAM, this can be achieved in accordance with the present invention by providing two overlapping regions, a 4 kb region for the supervisor code, and a 16 kb region for the user code The supervisor region would be defined to have a higher priority than the user region, thus ensuring that any attempt to access the 4 kb overlapping region is governed by the attributes associated with the supervisor region. Hence, in accordance with the present invention, only two regions need to be defined in this example, rather than the four regions that needed defining in accordance with the prior art techniques.

In preferred embodiments, one of said logical regions may be used as a background region covering the entire memory and having the lowest priority of said logical regions, whereby if the address issued by the processor corresponds to a memory location that is not within any of the other logical regions, then the attributes associated with the background region are used to control access to the memory location specified by that address.

It is possible that the memory regions defined do not completely fill the address space of the memory, and hence there will be "holes" in the address map. However, by configuring the lowest priority region to cover the entire memory address range, and specifying appropriate attributes for that logical memory region, then it is possible to define what happens if an access is made to a hole (for example the attributes could be set to full access or no access). Alternatively, a background region may not be defined, and separate arrangements would then need to be made within the system to determine what happens when access to a hole is attempted, eg. any access to a hole may result in an abort, or, if appropriate, any accesses to holes could be ignored.

Another alternative approach is to hardwire the lowest priority region to cover the total address space, and to not include that lowest priority region in the comparison process, such that if the address comparator logic generates a signal indicating that none of the logical regions contains said address, then the attribute determination logic is arranged to indicate that the attributes associated with the lowest priority region should be used. This approach can improve efficiency, since there is no need for the address comparator logic to compare the address with the address range for the lowest priority region, the attributes for this lowest priority region being used as a direct consequence of the address comparator logic determining that none of the other logical regions contain said address.

In preferred embodiments, the address ranges for the logical regions are specified by a base address identifying which memory location the region starts at, and a size attribute identifying the size of the logical region. In preferred embodiments, the base address is determined as a function of the size attribute, such that a memory region of size X must have a base address which is a multiple of the value X. This approach serves to simplify the hardware requirements. The base address and size attribute will typically be user programmable. As an alternative to using a base address and a size attribute, the address ranges for the logical regions may be specified by a start address and an end address identifying the start and end of the logical region.

The address comparator logic may be arranged in any suitable manner. In preferred embodiments, the address comparator logic comprises a number of comparators, one for each address range.

The address range storage may be provided by any suitable storage device. However, in preferred embodiments, the address range storage comprises a number of registers. Preferably, separate registers are associated with each comparator of the address comparator logic.

The attribute storage may take any appropriate form. However, in preferred embodiments, said attribute storage comprises a plurality of attribute registers connected to a multiplexer, each register containing the attributes for a logical region, the attribute determination logic outputting a signal to the multiplexer to cause the multiplexer to output the attributes from the attribute register corresponding to the highest priority region containing said address.

In preferred embodiments, said address comparator logic has a plurality of outputs, one output being provided for each logical region, and a signal being generated on said outputs to indicate whether the corresponding logical region contains said address, said attribute determination logic having a corresponding plurality of inputs for receiving the signals from said plurality of outputs, and the plurality of inputs having relative priorities used by the attribute determination logic to apply the predetermined priority criteria.

However, it will be appreciated that alternative techniques could be used for applying the predetermined priority criteria. For example, said predetermined priority criteria may be stored as priority information in a storage accessible by the attribute determination logic, the priority information specifying the relative priorities of said logical regions.

In preferred embodiments, the data processing apparatus further comprises a processor core for issuing addresses corresponding to memory locations within said memory where data values required by the processor are stored, or data values processed by the processor core are to be stored. Further, the data processing circuit may comprise a cache for storing data values accessible by the processor core. In such an arrangement, to improve efficiency, the determination of the attributes for the highest priority region preferably occurs whilst a cache look up is taking place.

A single cache may be provided for storing both instructions and data, such a cache often being referred to as having a Von Neumann cache architecture. However, alternatively, a first cache may be provided for storing instructions and a second cache may be provided for storing data, such a cache often being referred to as having a Harvard architecture, said address comparator logic and said attribute determination logic being replicated for each of said first and said second caches. Hence, when using separate data and instruction caches, the elements of the data processing circuit required to determine the attributes used to control access to memory are preferably replicated for each cache. As mentioned earlier, the determination of the attributes for the highest priority region preferably occurs whilst a cache look up is taking place. If there are two caches, a look up operation in the data cache may occur whilst a look up operation is also taking place in the instruction cache, and hence two sets of circuitry are required to determine the attributes to be used to access the memory addresses corresponding to the lookup operations in both the instruction and the data cache.

Viewed from a second aspect, the present invention provides a method of operating a data processing apparatus to control access to a memory having a plurality of memory locations for storing data values, each memory location having a corresponding address, the method comprising the steps of: (a) storing information identifying address ranges for a plurality of logical regions within said memory; (b) storing, for each logical region, attributes used to control access to memory locations within said logical region; (c) comparing an address issued by a processor corresponding to one of said memory locations with the address ranges for said plurality of logical regions; (d) if one or more of the logical regions contains said address, generating a signal indicating those logical regions containing said address; (e) responsive to the signal generated at said step (d), applying predetermined priority criteria to determine which logical region containing said address has the highest priority; and (f) outputting the stored attributes corresponding to that highest priority region for use in controlling access to the memory location specified by the address.

BRIEF DESCRIPTION OF THE DRAWINGS

An embodiment of the invention will be described hereinafter, by way of example only, with reference to the accompanying drawings in which like reference signs are used for like features, and in which:

FIG. 2 is a table illustrating how different sized logical regions within memory may be specified by a size field of five bits in accordance with preferred embodiments of the present invention;

DESCRIPTION OF A PREFERRED EMBODIMENT

Figure 1:
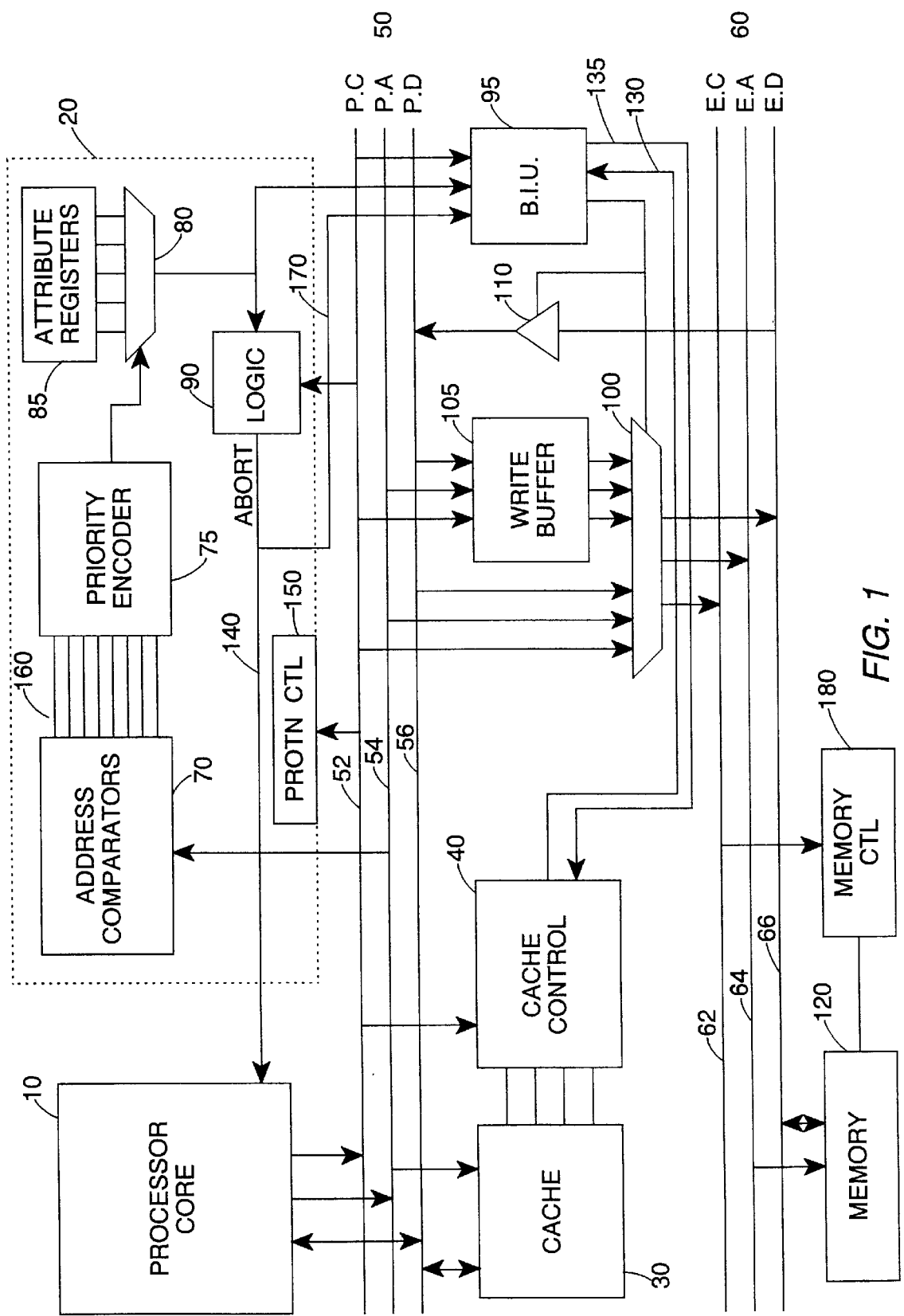
FIG. 1 is a block diagram illustrating a data processing apparatus in accordance with the preferred embodiment of the present invention.

A data processing circuit in accordance with the preferred embodiment of the present invention will be described with reference to the block diagram of FIG. 1. As shown in FIG. 1, the data processing circuit has a processor core 10 arranged to process instructions received from memory 120. Data required by the processor core 10 for performing those instructions may also be retrieved from memory 120. A cache 30 is provided for storing data and instructions retrieved from the memory 120 so that it is subsequently readily accessible by the processor core 10. The cache control unit 40 is also provided to control the storage of instructions and data in the cache 30, and to control the retrieval of the data and instructions from the cache.

In accordance with preferred embodiments of the present invention, a plurality of logical regions may be defined within the memory 120, each logical region having an independently programmable size. For the purpose of describing a preferred embodiment, a memory 120 having 4 GB of address space will be considered, and it will be assumed that 8 logical regions may be defined within the memory address space. Clearly, it will be apparent to those skilled in the art that the actual size of the memory, and the number of logical regions definable, may be varied as necessary to meet particular requirements of the data processing circuit.

Each logical region is preferably defined by a base address which specifies where the region starts in memory, and a size field defining the size of that logical region. In order to simplify the hardware requirements of the comparator within the protection unit (the protection unit is discussed in more detail later), a limitation is imposed that the base address must correspond to a "size" boundary. Hence, for example, a logical region having a size of 1 MB would be arranged to start at a base address corresponding to a 1 MB boundary within the memory. It will be appreciated by those skilled in the art that this limitation imposed on the base address in preferred embodiments is not essential, and that by providing more complex hardware within the protection unit, it would be possible to allow the base address to start at a memory location other than a size boundary.

In accordance with preferred embodiments, the size of a logical region may be chosen within the range of 4 KB to 4 GB. However, it will be appreciated that this choice of range may be altered as desired. FIG. 2 illustrates a table showing how a size register having a 5 bit field may be programmed for different memory sizes. In the example illustrated in FIG. 2, the size may vary by powers of two. However, it will be appreciated by those skilled in the art that there is no requirement for the size to be restricted to vary by powers of two, and by providing a size register having a larger number of bits, it is possible to provide additional flexibility in the programming of the size of each region.

As an alternative to using base and size registers, start and end registers may also be used to define the logical regions. In such cases, information corresponding to the actual addresses of the start and end of each logical region would be stored in registers, rather than the base address and the size of the region.

By allowing the logical regions to be defined using either base and size registers, or start and end registers, as discussed above, the user is able to program overlapping logical regions in memory. In preferred embodiments of the present invention, each logical region will have independent attributes, such as protection, cacheable and bufferable attributes, associated therewith. Given the possibility of overlapping logical regions, it is clearly important that any access to memory is handled in a predictable manner. In preferred embodiments, this is achieved by using the protection unit 20 illustrated in FIG. 1, and the operation of this protection unit will now be discussed in more detail.

When the processor core 10 requires an instruction or an item of data (hereafter instructions or data will both be referred to as data values), it places the memory address of that data value on bus line 54 of processor bus 50. Further, the processor core 10 issues a processor control signal on bus line 52. The processor control signal includes information such as whether the address corresponds to a read or a write request, the type of access (eg. sequential), the size of the access (eg. word, byte), the operating mode of the processor (eg. supervisor or user), etc. This processor control signal is received by the cache control unit 40 and prompts the cache control unit to determine whether the required data value is stored within the cache 30. The cache control unit 40 instructs the cache 30 to compare the address on bus line 54 with the addresses in the cache to determine whether the data value corresponding to that address is stored within the cache. If so, the data value is output from the cache 30 onto the data bus line 56 where it is then read by the processor core 10. If the data value corresponding to the address is not within the cache 30, then the cache control unit 40 passes a signal over line 130 to the bus interface unit 95 to indicate that the data value needs to be retrieved from memory 120.

Whilst this cache look up process is taking place, the protection controller 150 within protection unit 20 also receives the processor control signal on bus line 52, and upon determining that the processor control signal relates to a potential read or write access to memory 120 or cache 30, instructs the address comparators 70 to examine the address placed by the processor core 10 on bus line 54. In preferred embodiments, there is one address comparator for each logical region, and each of the comparators has an associated register containing the address range for a particular logical region. Each comparator is arranged to compare that address range with the particular address on bus line 54 to determine whether the address is contained within the corresponding logical region. Whenever a comparator determines that the address lies within the address range of a logical region, it outputs a hit signal to the priority encoder 75 over a corresponding line 160.

The priority encoder 75 receives the signals output by all of the comparators 70. If the priority encoder receives one hit signal, then this indicates that the address only lies within one logical region. In that case, the priority encoder 75 sends a signal to the multiplexer 80 instructing the multiplexer 80 to select from the attribute registers 85 the attributes corresponding to that logical region. These attributes are then used to control access to the memory 120 or use of the data values retrieved from the cache 30. In preferred embodiments, there will always be at least one hit signal generated, since one of the logical regions will be a background region covering the entire address space of memory 120. However, it is not essential that a background region is defined, and hence, in alternative embodiments, it is possible that no hit signals may be generated by the address comparators 70. In this case, the priority encoder 75 will be arranged to produce a signal indicating that no hits have been detected, and this signal will be output from the priority encoder 75 to the logic 90. How the data processing circuit reacts to this case would depend on how the logic 90 is arranged. For example, the logic may be arranged such that any attempt to access an address not contained within any of the logical regions will result in an abort signal being returned to the processor core 10 over line 140.

Assuming more than one hit signal is output by the address comparators 70, then the priority encoder 75 is arranged to apply priority criteria in order to determine the relative priorities of each of the defined logical regions. Priority information relating to each logical region may be stored within the protection unit 20, and, for each logical region for which the address comparators have generated a hit signal, the priority encoder may be arranged to use the corresponding priority information to determine which logical region has the highest priority.

However, in preferred embodiments, the relative priorities of the logical regions is determined by the arrangement of the inputs to the priority encoder 75. If there are eight address comparators 70 (comparators 0–7) corresponding to eight logical regions (logical regions 0–7), then there will preferably be eight corresponding wires 160 connected to eight inputs (inputs 0–7) at the priority encoder 75. The inputs corresponding to the logical regions can then be assigned priorities, such that priority increases with the input number, ie. input number 7 has highest priority, input number 0 has lowest priority.

The priority encoder is then arranged to apply conditional logic, determining first whether a hit signal has been received at input number 7 corresponding to logical region 7. If so, then a signal is output from the priority encoder 75 to the multiplexer 80 indicating that the attributes for logical region 7 should be output from the attribute registers 85. If no hit signal has been received at the input corresponding to logical region 7, then the priority encoder 75 determines whether a hit signal has been received at input number 6 corresponding to logical region 6. If so, then a signal is output from the priority encoder 75 to the multiplexer 80 indicating that the attributes for logical region 6 should be output from the attribute registers 85. If no hit signal has been received at the input corresponding to logical region 6, then the same process is repeated for each input in turn until an input with a hit signal is found. It will be appreciated that, although the above description identifies the process in logical terms, the actual process performed would typically not be performed sequentially as described, but instead suitable logic would be provided to receive all of the eight inputs together and to generate an output which identifies the highest priority region.

In preferred embodiments, there will always be a hit signal in the lowest priority region (region 0) since this will be set up as a background region covering the entire memory address space. Hence, the processing performed by the priority encoder 75 will result in a signal being sent to multiplexer 80 instructing the multiplexer to retrieve from the attribute registers 85 the attributes corresponding to the highest priority region containing the address issued by the processor core 10. The attributes output by the multiplexer 80 are then passed to logic unit 90 and to the Bus Interface Unit 95. The logic unit 90 also receives the processor control signal from bus line 52. This processor control signal defines, amongst other things, the mode of operation of the processor core 10. Hence logic 90 can use this information to determine whether the attributes output by the multiplexer 80 allow the processor core 10 in its current mode of operation to have access to the memory address requested. For example, if the logic unit 90 determines that the processor core 10 is in a user mode, and the attributes output by multiplexer 80 indicate that the memory address can only be accessed in supervisor mode, then logic 90 can be arranged to produce an abort signal on path 140 to the processor core 10 and on path 170 to the Bus Interface Unit 95.

The processing performed by the protection unit 20 preferably happens at the same time as the cache look up process so as to maintain sufficient processing speed. If the data value requested is available in the cache 30, and the logic unit 90 does not produce an abort signal on line 140, then the processor core 10 will use the data retrieved from cache 30. However, if the data value requested is not available in cache, then, as discussed earlier, a signal will be sent over path 130 instructing the Bus Interface Unit (BIU) 95 to access the memory 120 for the data value.

The BIU 95 will examine the processor control signal on bus line 52 to determine whether the instruction issued by the processor core 10 is a read or a write instruction. Assuming it is a read instruction, and that no abort signal is received over path 170 from the logic 90, then the BIU 95 will instruct the multiplexer 100 to pass the address from bus line 54 on to the external address bus line 64 of bus 60 (this is assuming that no pending write instructions to memory 120 are pending in the write buffer 105—if there are any such pending write instructions, these will be completed prior to the read instruction. The action of the write buffer is discussed in more detail later). A control signal will also be placed on bus line 62 which is used by memory controller 180 to control access to the memory 120. The memory controller 180 will determine from the control signal on bus line 62 that a memory read is required, and will instruct the memory to output on the data bus line 66 the data at the address indicated on address bus line 64.

The BIU 95 will send a signal to buffer 110 to cause the buffer 110 to pass the data placed by the memory 120 on external bus line 66 to the processor bus line 56. Additionally, if the attributes received by the BIU 95 from the multiplexer 80 of the protection unit 20 indicate that the address contains a cacheable data value, then the BIU 95 will send a signal over path 135 to the cache control 40 to instruct the cache control to store the retrieved data value in cache 30. The data value retrieved from the memory 120 and placed on bus line 56 will then be stored in the cache 30 and also passed to the processor core 10. Subsequently, that data value can readily be accessed by the processor core 10 directly from the cache. If the attributes received by the BIU 95 indicate that the data value is not cacheable, then the data will not be stored in cache, and the processor core 10 will read the data value from bus line 56.

The above description has illustrated how the protection unit 20 is used to control access to the memory 120 for the purposes of reading data values from the memory 120. In the event that the address issued by the processor core 10 is an address to which the processor wishes to write a data value, then the following procedure takes place.

The processor core will place a processor control signal on bus line 52, an address on bus line 54, and the data value to be stored on bus line 56. The protection controller 150 within protection unit 20 will examine the processor control signal on bus line 52, and upon determining that the processor control signal relates to a write access to memory 120, will instruct the address comparators 70 to examine the address placed by the processor core 10 on bus line 54. The protection unit will then perform the same procedure described earlier with reference to a read instruction in order to determine the highest priority logical region containing that address. This will result in the attributes corresponding to that region being output to the BIU 95 and to the logic 90.

The BIU 95 will examine the processor control signal on bus line 52 to determine whether the instruction issued by the processor core 10 is a read or a write instruction. Assuming it is a write instruction, the BIU will determine that a write procedure needs to be employed, and will use the attribute information received from the protection unit 20 to control that write procedure.

The logic unit 90 will have determined from the attributes output by multiplexer 80 and from the processor control signal whether the processor core is able to write to the particular address in its current mode of operation, and if not, will have issued an abort signal. Any abort signal will be sent to the BIU 95 over path 170 to instruct it to disregard the write instruction, and will also be sent to the processor core 10 over path 140 to cause the data, address and control information to be removed from bus lines 56, 54 and 52, respectively, and to enable the processor core 10 to execute any exception procedure required in the event of such an abort.

However, assuming the processor core is entitled to write to the address placed on bus line 54, and hence no abort signal is received by the BIU 95, then the BIU 95 will use the attribute information from multiplexer 80 to determine whether the data to be written is bufferable or not. If the data is bufferable, then the BIU 95 will instruct the write buffer 105 to retrieve the data, address and control signals from bus 50. Once this has been done, the next instruction can be processed by the processor core 10 without waiting for the write instruction to have been completed.

The write buffer is preferably a FIFO buffer. When the external bus 60 is free, the BIU 95 instructs the multiplexer 100 to output the next item from the write buffer onto the external bus 60. The multiplexer 100 will then output the necessary control, address and data signals on bus lines 62, 64 and 66 respectively, the memory controller 180 using the control signal to control the write access to memory 120. At this point, the data will be stored in the memory 120. As the data to be stored is sequentially processed from the write buffer 105, then at some point the data corresponding to the address issued by the processor on bus line 54 will be stored in the memory 120.

If, however, the Bus Interface Unit 95 determines that the address to which the data is to be stored is not bufferable, then the Bus Interface Unit 95 will instruct the multiplexer 100 to select the processor control, address and data information from bus lines 52, 54 and 56 directly. The multiplexer 100 will then output this information onto the external bus 60 so as to cause the data to be stored at the corresponding address in memory 120. However, prior to doing this, the write buffer 105 would typically be drained of any entries within it, so as to ensure that the write instructions are processed in the correct order. Once the non bufferable data corresponding to the current write instruction has been stored, the next instruction can then be processed.

Figure 3:
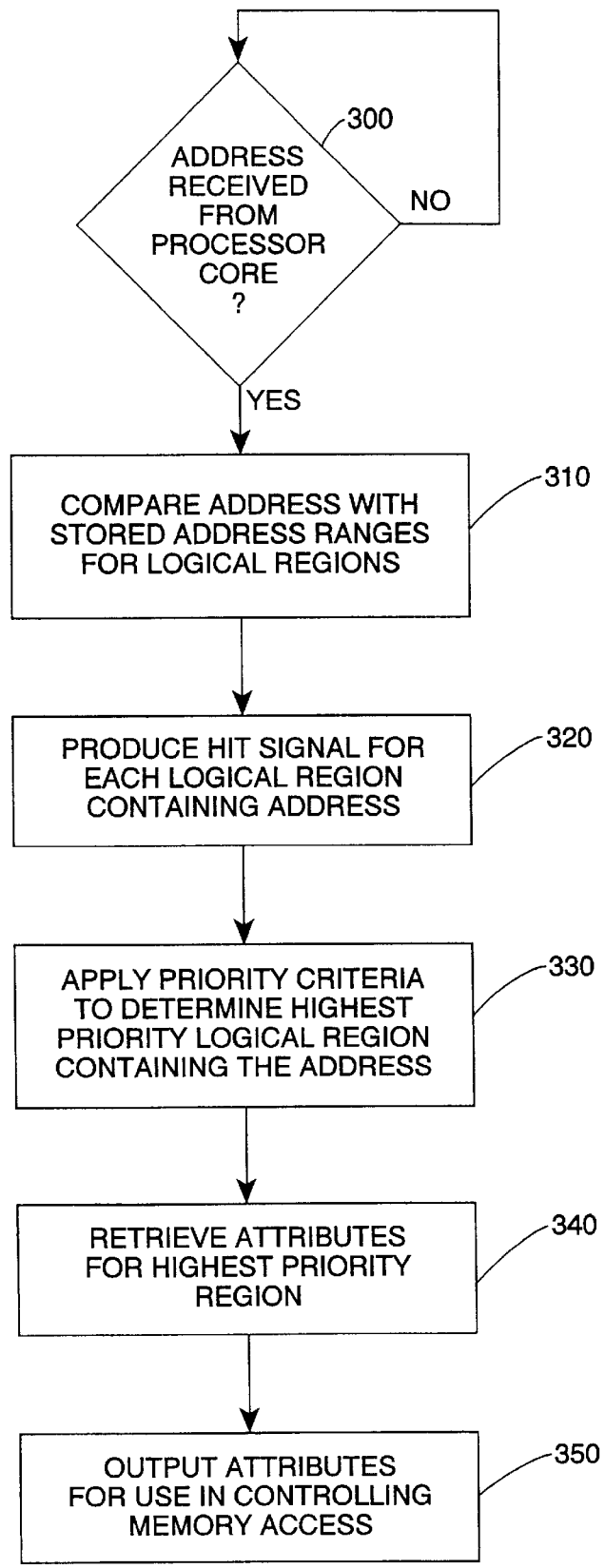
FIG. 3 is a flow diagram illustrating the processing steps performed in accordance with preferred embodiments of the present invention in order to determine the attributes to be used to control access to a memory.

The process performed by the protection unit 20 will now be discussed with reference to FIG. 3, which is a flow diagram illustrating the processing steps performed within the protection unit 20. At step 300, the protection unit 20 waits for an address to be placed by the processor core 10 on the address bus line 54. As mentioned earlier, the protection controller 150 within the protection unit 20 is responsive to a control signal on the PC bus 52 to instruct the address comparators 70 to examine the address placed by the processor core 10 on bus line 54. In preferred embodiments, there is one address comparator provided for each logical region, and hence in preferred embodiments there are eight address comparators within the address comparator block 70. Each address comparator has an associated address register containing the address range for the corresponding logical region. The address received from the address line 54 is compared with the address range in the associated register at step 310, and, if the address lies within that address range, a "hit" signal is output by that address comparator on a corresponding wire 160 at step 320.

All of the signals generated by the address comparators 70 are passed to the priority encoder 75, where, at step 330, priority criteria are applied to determine the logical region containing the address that has the highest priority. As mentioned earlier, in preferred embodiments this is performed by arranging the priority encoder to apply conditional logic, determining first whether a hit signal has been received at the input corresponding to the highest priority region. If not, then the input corresponding to the next highest priority region is checked, and so on, until a hit signal is identified. Since the priority encoder 75 logically checks the inputs in order of decreasing priority, the first hit signal identified will correspond to the highest priority logical region containing the address issued by the processor core 10. It will be appreciated that this process need not be performed sequentially one input at a time, and in preferred embodiments suitable logic would be provided to receive all of the eight inputs together and to generate an output which identifies the highest priority region.

In preferred embodiments, there will always be at least one hit signal, since either the entire address space will be covered by the various logical regions, or one of the logical regions will be a background region covering the entire address space of memory 120. However, it is not necessary for a background logical region to be defined, and hence it is possible that there may be no hit signals produced, indicating that the address issued by the processor core 10 corresponds to a "hole" in memory 120. In such instances, in the absence of a background region, the system will typically be hardwired to define how accesses to holes are handled; for example, it may be arranged that any access to a hole will result in an abort signal being generated by logic 90. If, on the other hand, a logical background region is defined, then there is no need to rely on this, since the attributes corresponding to that background region will be used to control the access.

Assuming a background region is to be defined as the lowest priority region, this background region may be hardwired to cover the total address space. Then, this lowest priority region can be excluded from the comparison process performed by the address comparators 70, thereby resulting in one less comparator and one less wire 160 to the priority encoder 75. If no hit signals are generated by the address comparators 70, thereby indicating that none of the other logical regions contain said address, then the priority encoder 75 may be arranged to send a signal to the multiplexer 80 to instruct it to select the attributes associated with the lowest priority region. This approach can improve efficiency, although slightly reducing flexibility, since the address comparators do not compare the address with the address range for the lowest priority region, the attributes for this lowest priority region being used as a direct consequence of the address comparators determining that none of the other logical regions contain said address.

Once the priority encoder 75 has determined which logical region containing the address has the highest priority, then it outputs a signal to the multiplexer 80 to instruct the multiplexer to select, at step 340, the attributes from the attribute register 85 containing the attributes for that logical region. Once the attributes have been selected by the multiplexer 80, those attributes are output at step 350 for use in controlling memory or cache access.

In preferred embodiments, a final check is performed by logic unit 90 to determine whether the attributes output at step 350 indicate that the processor core 10 in its current mode of operation should not have access to the memory address within the logical region defined by those attributes.

For example, if the processor core 10 is operating in a user mode, and one of the attributes output at step 370 indicates that the address is only accessible in supervisor mode, logic unit 90 will issue an abort signal over path 140 to the processor core 10 to indicate that the processor core 10 cannot access that memory region, and will also send the abort signal to BIU 95 over path 170.

The above description has discussed a data processing apparatus in which a plurality of logical memory regions of variable size may be defined, and in which those logical memory regions may be overlapped in order to improve the flexibility of the apparatus.

Although a particular embodiment has been described herein, it will be appreciated that the invention is not limited thereto and that many modifications and additions thereto may be made within the scope of the invention. For example, the cache 30 may be used to store both instructions and data as illustrated in FIG. 1, or, alternatively, one cache may be provided for storing instructions, and a separate cache provided for storing data. In this latter case, two protection units 20 would preferably be used, one for instructions and one for data. Two ways in which this could be implemented are illustrated in FIGS. 4A and 4B.

Figure 4A:
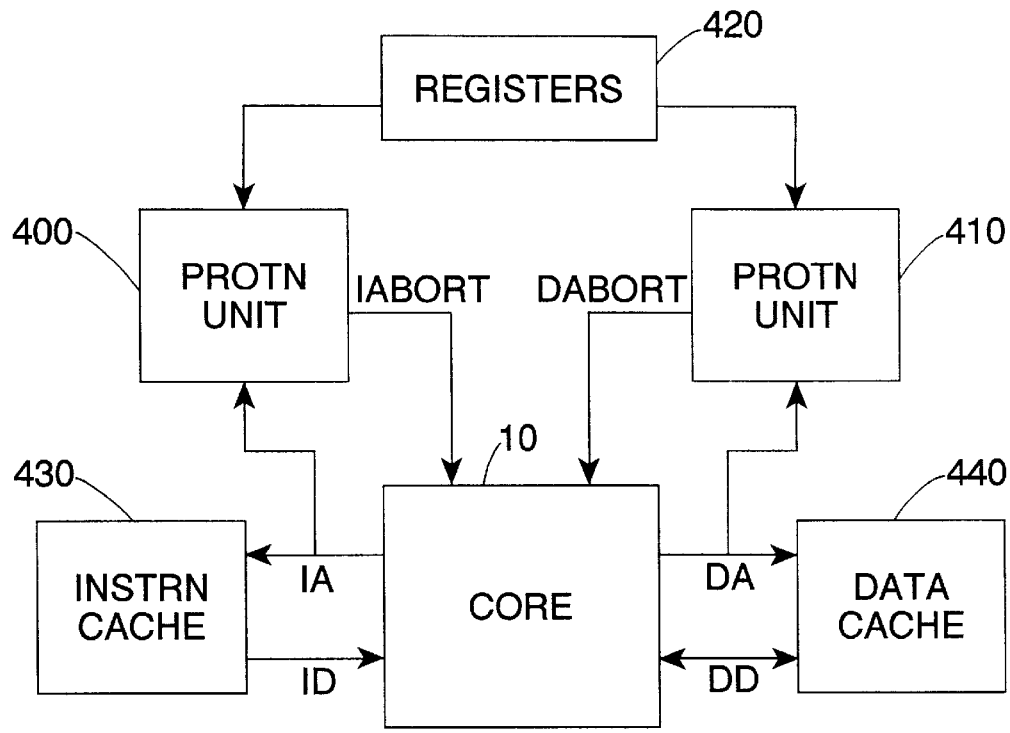
FIGS. 4A and 4B illustrate embodiments of the present invention in which separate data and instruction caches are used.

In FIG. 4A, instruction cache 430 and data cache 440 are simultaneously accessible by the processor core 10. When an instruction address is used for a cache lookup in instruction cache 430, that address is also applied to protection unit 400 to determine the attributes that should be used to control access to memory if required. Similarly, when a data address is used for a cache lookup in data cache 440, that address is also applied to protection unit 410 to determine the attributes that should be used to control access to memory if required. The protection units 400 and 410 are preferably the same as protection unit 20 illustrated in FIG. 1, with the exception that the attribute registers and the registers defining the logical regions are now provided by one set of registers 420. Hence, in FIG. 4A, the same logical regions and attributes are used for both data and instruction accesses to memory.

Figure 4B:
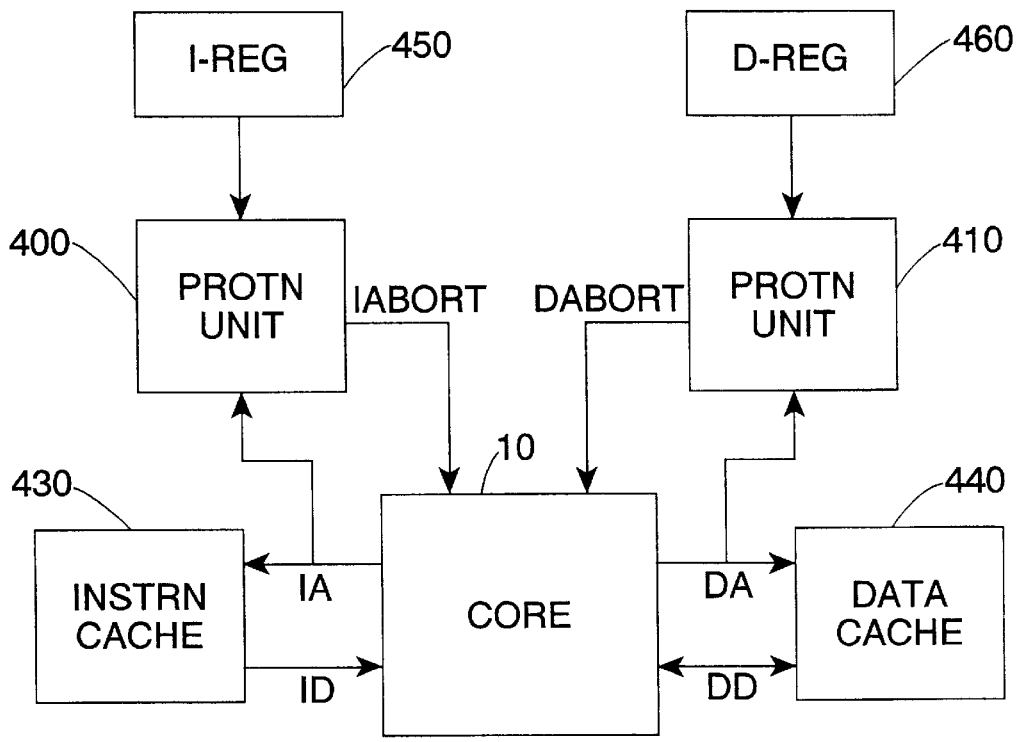

However, an alternative approach illustrated in FIG. 4B is for the protection units 400 and 410 to have separate registers 450 and 460, respectively, thereby allowing different sized logical regions having different attributes to be specified for data and instruction accesses. This provides more flexibility, since, for example, there may be a requirement for different sized data regions to instruction regions.

We claim:

1. A data processing apparatus for controlling access to a memory having a plurality of memory locations for storing data values, each memory location having a corresponding address, the apparatus comprising:

address range storage for storing information identifying address ranges for a plurality of logical regions within said memory;

attribute storage for storing, for each logical region, attributes used to control access to memory locations within said logical region;

address comparator logic for comparing an address issued by a processor corresponding to one of said memory locations with the address ranges for said plurality of logical regions, and, if one or more of the logical regions contain said address, for generating a signal indicating those logical regions containing said address;

attribute determination logic, responsive to the signal generated by the address comparator logic, for applying predetermined priority criteria to determine which logical region containing said address has the highest priority, and to output the attributes in the attribute storage corresponding to that highest priority region for use in controlling access to the memory location specified by the address; wherein one of said logical regions being a background region covering the entire memory and having the lowest priority of said logical regions, whereby if the address issued by the processor corresponds to a memory location that is not within any of the other logical regions, then the attribute determination logic is arranged to output the attributes associated with the background region.

2. A data processing apparatus for controlling access to a memory having a plurality of memory locations for storing data values, each memory location having a corresponding address, the apparatus comprising:

address range storage for storing information identifying address ranges for a plurality of logical regions within said memory;

attribute storage for storing, for each logical region, attributes used to control access to memory locations within said logical region;

address comparator logic for comparing an address issued by a processor corresponding to one of said memory locations with the address ranges for said plurality of logical regions, and, if one or more of the logical regions contain said address, for generating a signal indicating those logical regions containing said address;

attribute determination logic, responsive to the signal generated by the address comparator logic, for applying predetermined priority criteria to determine which logical region containing said address has the highest priority, and to output the attributes in the attribute storage corresponding to that highest priority region for use in controlling access to the memory location specified by the address, wherein the lowest priority region is hardwired to be a background region covering the entire memory, that lowest priority region not being included in the comparison process performed by said address comparator logic, such that if the address comparator logic generates a signal indicating that none of the logical regions contains said address, then the attribute determination logic is arranged to indicate that the attributes associated with the lowest priority region should be used for controlling access to the memory location specified by the address.

3. A data processing apparatus as claimed in claim 1, wherein the address ranges for the logical regions are specified by a base address identifying which memory location the region starts at, and a size attribute identifying the size of the logical region.

4. A data processing apparatus as claimed in claim 3, wherein the base address is determined as a function of the size attribute, such that a memory region of size X must have a base address which is a multiple of the value X.

5. A data processing apparatus as claimed in claim 3, wherein the base address and size attribute are user programmable.

6. A data processing apparatus as claimed in claim 1, wherein the address ranges for the logical regions are specified by a start address and an end address identifying the start and end of the logical region.

7. A data processing apparatus as claimed in claim 6, wherein the start address and end address are user programmable.

8. A data processing apparatus as claimed in claim 1, wherein said address comparator logic comprises a number of comparators, one for each address range.

9. A data processing apparatus as claimed in claim 1, wherein said address range storage comprises a number of registers.

10. A data processing apparatus as claimed in claim 9, wherein said address comparator logic comprises a number of comparators, and wherein separate registers are associated with each comparator.

11. A data processing apparatus as claimed in claim 1, wherein said attribute storage comprises a plurality of attribute registers connected to a multiplexer, each register containing the attributes for a logical region, the attribute determination logic outputting a signal to the multiplexer to cause the multiplexer to output the attributes from the attribute register corresponding to the highest priority region containing said address.

12. A data processing apparatus as claimed in claim 1, wherein said address comparator logic has a plurality of outputs, one output being provided for each logical region, and a signal being generated on said outputs to indicate whether the corresponding logical region contains said address, said attribute determination logic having a corresponding plurality of inputs for receiving the signals from said plurality of outputs, and the plurality of inputs having relative priorities used by the attribute determination logic to apply the predetermined priority criteria.

13. A data processing apparatus as claimed in claim 1, wherein said predetermined priority criteria are stored as priority information in a storage accessible by the attribute determination logic, the priority information specifying the relative priorities of said logical regions.

14. A data processing circuit as claimed in claim 1, further comprising:

a processor core for issuing addresses corresponding to memory locations within said memory where data values required by the processor are stored, or data values processed by the processor core are to be stored.

15. A data processing circuit as claimed in claim 14, further comprising a cache for storing data values accessible by the processor core.

16. A data processing circuit as claimed in claim 15, wherein a first cache is provided for storing instructions and a second cache is provided for storing data, said address comparator logic and said attribute determination logic being replicated for each of said first and said second caches.

17. A method of operating a data processing apparatus to control access to a memory having a plurality of memory locations for storing data values, each memory location having a corresponding address, the method comprising the steps of:

(a) storing information identifying address ranges for a plurality of logical regions within said memory;

(b) storing, for each logical region, attributes used to control access to memory locations within said logical region;

(c) comparing an address issued by a processor corresponding to one of said memory locations with the address ranges for said plurality of logical regions;

(d) if one or more of the logical regions contains said address, generating a signal indicating those logical regions containing said address;

(e) responsive to the signal generated at said step (d), applying predetermined priority criteria to determine which logical region containing said address has the highest priority; and (f) outputting the stored attributes corresponding to that highest priority region for use in controlling access to the memory location specified by the address, wherein one of said logical regions is a background region covering the entire memory and having the lowest priority of said logical regions, whereby if the signal generated at said step (d) indicates that the address issued by the processor corresponds to a memory location that is not within any of the other logical regions, then at said step (f) the stored attributes associated with the background region are output.

* * * * *